Figure 1:
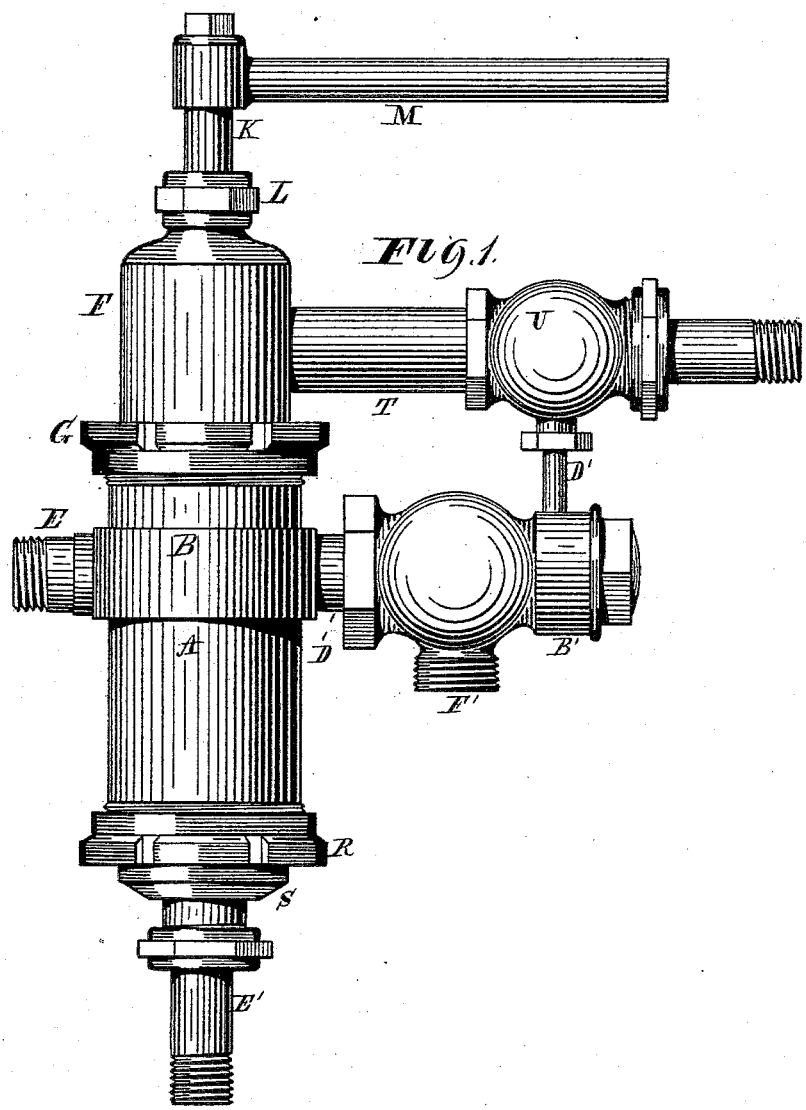

(Model.)

2 Sheets—Sheet 1.

W. W. COWLEY.
STEAM BOILER INJECTOR.

No. 296,731. Patented Apr. 15, 1884.

Witnesses.

Inventor.

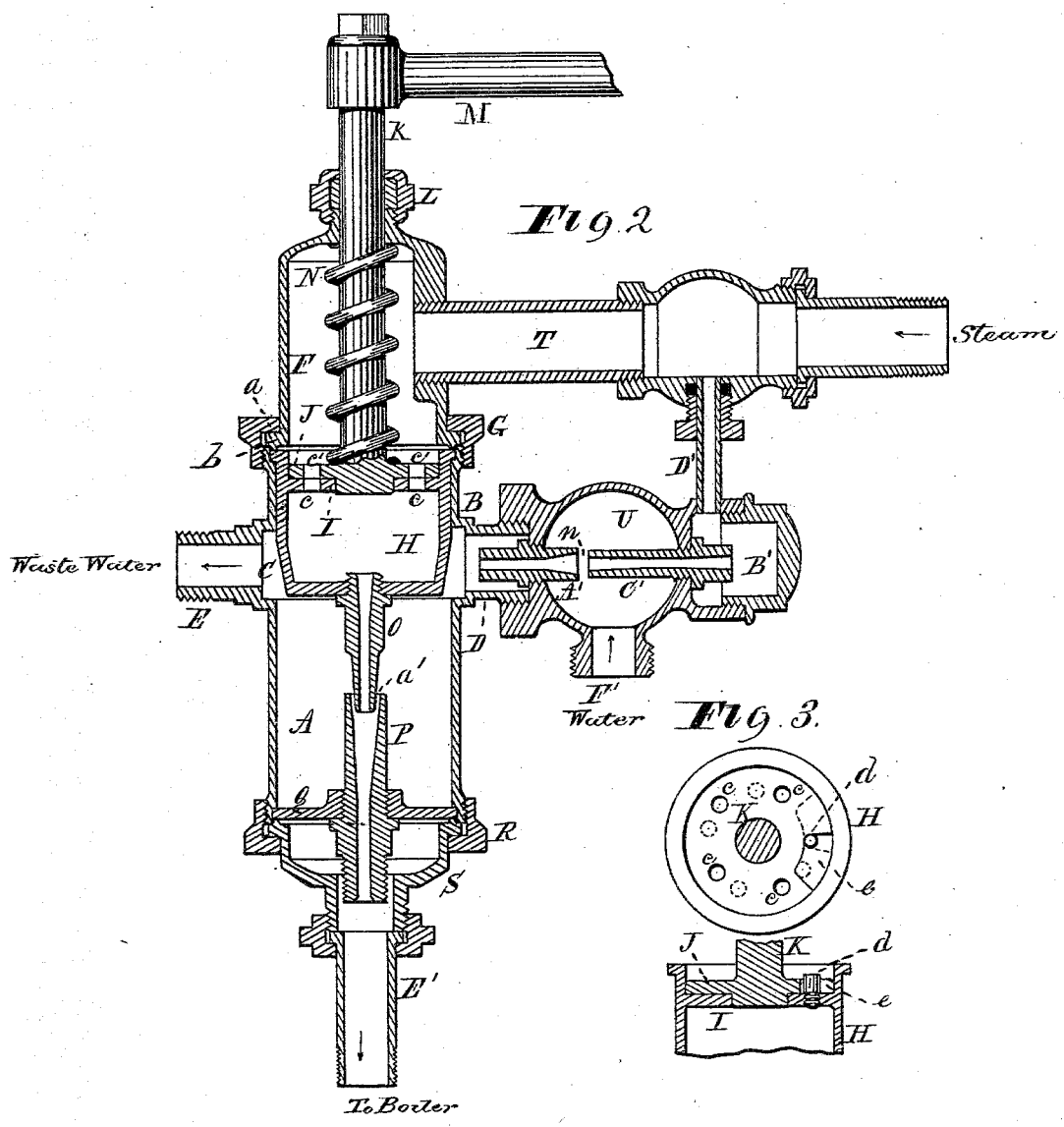

UNITED STATES PATENT OFFICE.

WILLIAM W. COWLEY, OF CLEVELAND, OHIO.

STEAM-BOILER INJECTOR.

SPECIFICATION forming part of Letters Patent No. 296,731, dated April 15, 1884.

Application filed December 13, 1883. (Model.)

*To all whom it may concern:*

Be it known that I, WILLIAM W. COWLEY, of Cleveland, in the county of Cuyahoga and State of Ohio, have invented a certain new and Improved Steam-Boiler Injector.

The following is a full and complete description of the injector above alluded to, and the accompanying drawings, making a part of this specification, will be referred to for illustrating the same.

Of said drawings, Figure 1 represents a side view of the injector. Fig. 2 shows a transverse vertical section. Fig. 3 is a detached section.
In the several views like parts will be indicated by the same letters.

The body of the injector consists of a cylinder, A, having near the upper end thereof an enlargement, B, forming an interior annular recess, C, Fig. 2. Said recess is provided on one side with an inlet D, and directly on the opposite side is a waste-pipe, E.

To the upper end of the cylinder A is connected a chamber, F, by means of a screw-coupling collar, G, which, by screwing the collar onto the end of the cylinder, the flange *a* of the collar engages the flange *b* of the chamber, thereby drawing the parts firmly together, as shown in Fig. 2.
In the upper end of the cylinder A is fitted a steam-chamber, H, provided with a diaphragm, I, forming a seat for the valve J, of which K is the stem, passing up through the end of the chamber, and made tight therein by an ordinary stuffing-box, L.

In the diaphragm or valve-seat I, alluded to, are steam-ports *c*, arranged in respect to each other as shown in Fig. 3. Also in the valve J are the same number of ports *c'*, so arranged as to register with the several parts in the valve-seat, as shown in Fig. 1, which may be brought in open relation to each other, as shown in said figure, or in any partial open relation by rotating the valve by the stem K, actuated by the handle M. The movement of the valve for opening and closing the steam-ports is governed by the stud *d*, Fig. 2, projecting upward from the valve-seat and through the valve by passing through the notch *e*, made in the edge of the valve. The length of the notch allows the valve to be rotated in either direction to close or open the ports.

N is a spring coiled around the stem of the valve, and by its resiliency keeps the valve close down upon its seat.

In the bottom of the steam-chamber H, above referred to, is screwed a tube, O, the lower end of which is tapering and descends to and terminates in the end of an eduction-pipe, P. The bore of said eduction-pipe is enlarged so that the end of the tube inserted therein does not fill the bore of the pipe P, there being a narrow space between the end of the tube and the bore of the pipe, as shown in Fig. 1, the purpose of which will presently be shown. The abovesaid pipe P passes through the bottom Q of the cylinder A, and is screwed therein, that it may be detached for repairs or for other needful purposes. The bottom Q is also detachable from the cylinder, and is secured in connection therewith by a screw-collar, R, and cap S, substantially as shown in Fig. 1. The lower end of the pipe P terminates in the outlet of the cap S. In the side of the steam-chamber F, above alluded to, is screwed a steam-pipe, T, and to the inlet D of the cylinder A is attached a hollow globe, U, put in communication with the cylinder A by a tube, A', screwed into the side of the globe, and projecting therein. The opposite end of the said tube projects into the inlet D, thereby putting the interior of the globe in direct communication with the interior of the cylinder A at the recess C thereof. The interior of the globe U is in open relation with a steam-chamber, B', by a tube, C', screwed into the side of the globe and projecting therein near to the end of the tube A', and in alignment therewith, as seen in the drawings, in which it will be observed that the ends of the tubes approximate, but do not touch. The chamber B' and the steam-pipe T are put in communication one with the other by a pipe, D'.

As hereinbefore remarked, this apparatus is for injecting water into steam-boilers and for drawing the water from the well or other water-source for that purpose. To this end the injector may be located in any desirable or convenient place, and put in connection with the steam-boiler by means of the pipe T, which may be of any length suitable for that purpose. By means of a pipe the end E' of the injector is also put in communication with the steam-boiler, and the globe U, by a pipe attached to the inlet F', is put in communication with a well or other source of water. To supply the boiler with water with the full capacity of the injector the steam-ports c and c' are open in full, as shown in Fig. 1. Steam is now admitted into the chamber F through the pipe T. As steam passes through the said pipe T into the chamber F a portion thereof passes down the tube D' into the chamber B', thence through the pipe C' to the tube A'. The steam issuing from the pipe C', in passing therefrom across the space n, between the ends of the tube A' and the said pipe C', causes a vacuum in the globe, thereby lifting water from the well into the globe, which flows therefrom through the tube A' into the cylinder A, together with the steam from the chamber B', more or less condensed by the water lifted from the well. The water thus conducted into the cylinder A is forced therefrom into the boiler by the steam as it issues from the chamber F, through the ports c and c', into the chamber H, thence through the tube O into the pipe P, and pipe E' back to the boiler. The abovesaid steam, under the full pressure of the boiler, and filling the large chamber H, forces the water from the cylinder A into the pipe P through the narrow space at a', between the end of the tube O and the pipe P, in which the end of the tube is inserted, as above described. The water thus forced from the cylinder by the pressure of the steam goes therewith into the boiler.

The capacity of the space a' around the end of the tube O for discharging water from the cylinder is equal to the capacity of the tube A' for conducting water therein, and which is sufficient to supply the boiler under the fullest needs, but which may be reduced to any amount less by closing the steam-ports c and c' more or less, thereby shutting off the steam accordingly, by which its pressure is lessened in the chamber H and its passage through the tube O and pipe P retarded, and consequently attended by a proportionate flow of water into the boiler from the cylinder, and also a consequent less lifting of water into the globe U. Should there be a surplus of water or more than enough to supply the boiler, it is allowed to escape from the cylinder through the waste-pipe E and conveyed back into the well or otherwise disposed of.

From the above it will be obvious that the supply of water to the boiler is easily and readily graduated, as the boiler may require, by opening or closing the ports c and c', and the water wholly shut off by closing the said ports.

What I claim as my invention, and desire to secure by Letters Patent, is—

1. In steam-boiler injectors, the cylinder A and steam-chamber F, connected to each other in the relation shown and described, said cylinder having therein a steam-chamber, H, provided with a diaphragm or valve-seat, having therein steam-ports c, rotating valve provided with steam-ports c', arranged to register with the ports c of the diaphragm or valve-seat, separating the interior of the steam-chamber from the interior of the cylinder, valve-stem, and spring constructed and arranged to co-operate, substantially as set forth, and for the purpose specified.

2. The arrangement and combination of the steam-chamber F, steam-chamber B', pipe T, pipe D', and hollow globe provided with an inlet for the passage of water therein, substantially as herein set forth.

3. The cylinder A, provided with an enlargement forming an interior recess around the steam-chamber H, inlet B, and waste-water pipe, substantially as herein set forth.

In testimony whereof I affix my signature in presence of two witnesses.

WILLIAM W. COWLEY.

Witnesses:
J. H. BURRIDGE,
C. H. TUMEY.